Jan. 1, 1963 C. A. GRAN 3,071,287
CONTAINER AND FILLING MEANS THEREFOR
Filed April 10, 1961
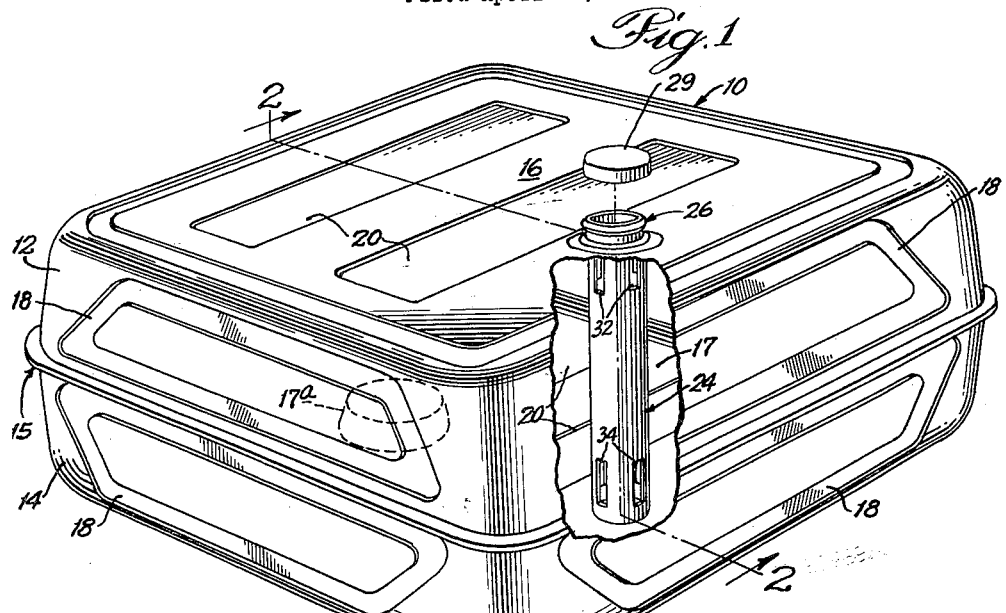
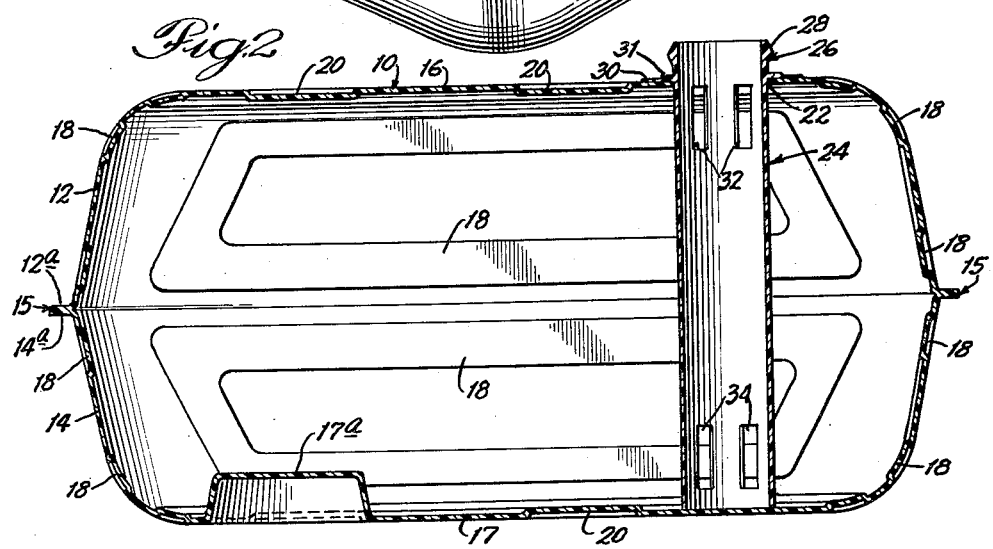
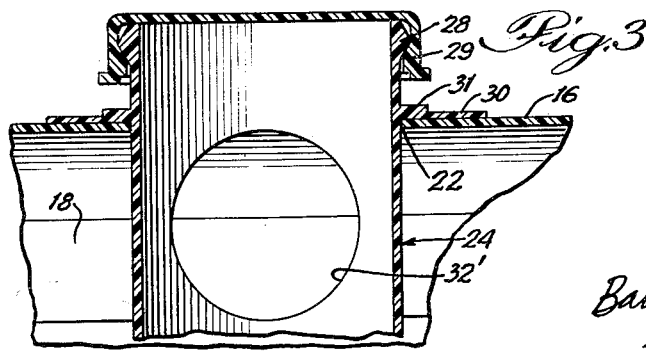
INVENTOR:
Carl A. Gran,
BY
Bair, Freeman & Molinare
ATTORNEYS.

3,071,287
Patented Jan. 1, 1963

3,071,287
CONTAINER AND FILLING MEANS THEREFOR
Carl A. Gran, 221 S. Derbyshire Lane,
Arlington Heights, Ill.
Filed Apr. 10, 1961, Ser. No. 101,895
3 Claims. (Cl. 220—86)

This invention relates to a container and filling means therefor, and more particularly this invention relates to a relatively flexible container having filling and capping means that are adapted for use with automatic machines.

It has been contemplated forming single service, or discardable, containers for milk and the like from plastic materials that are of relatively thin gauge and which may even be flexible. It would be desirable to be able to adapt such plastic containers for use with the automatic filling and capping machines that are now utilized in dairies and the like for filling existing rigid containers.

Thus, one object of this invention is to provide a container and filling means therefor wherein the filling means is rigidified to adapt the device for use with automatic filling and capping machines.

Another object of this invention is to provide a single service container with a filling tube therefor, wherein the filling tube provides a rimmed edge adapted to receive thereon existing closure caps, and wherein the tube alone provides the rigidity necessary for use with automatic capping machines, and wherein the tube is provided with aperture means for assisting in the selective filling and emptying of the container.

A further object of this invention is to provide a single service container with filling tube therefor which is characterized by its simplicity and inexpensiveness of construction and by its utility with existing filling and capping machines.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

FIGURE 1 is a perspective view of one form of my invention;

FIGURE 2 is a vertical cross-section view taken on line 2—2 of FIGURE 1; and

FIGURE 3 is an enlarged detail view of the cappable end of the filling tube and also shows a modified form of the filling tube.

Referring now to the drawings, FIGURE 1 illustrates a single-service container generally indicated at 10, which may be used as a disposable carton for milk, or the like. Container 10 is preferably made from a relatively thin gauge plastic and the walls of the container are appropriately reinforced by ribs or the like, as seen in FIGURES 1 and 2 for the purposes of strength.

The container defining means is, preferably, composed of complementary upper and lower sections that may be heat sealed together to define the composite container. As shown, the container 10 includes an upper dished section 12 that is provided with an outwardly extending peripheral flange 12a and the lower dished section 14 that is provided with a peripheral flange 14a. The flanges 12a and 14a when abutted together are then heat sealed to define the hollow container 12 surrounded by a unitary flange, generally indicated at 15. The container 10, as thus defined by the sections 12 and 14, provides a top 16 and a bottom 17, spaced apart by upright sides. The upright sides are provided with appropriate ribbing 18, and the top and bottom are provided with additional appropriate ribbing, indicated at 20, to provide strength for the relatively thin walls of the container.

The top 16 is formed with an aperture 22 that is offset from the center of the container toward one edge thereof. An elongated filler tube 24, of an axial length greater than the spacing between top 16 and bottom 17 is provided, for extending through aperture 22 into the container 10. The upper end of tube 24 provides a protruding portion, generally indicated at 26, which extends outwardly or above top 16. The uppermost end of tube 24 is shaped to define an outwardly projecting enlarged rim bead 28 that is adapted to releasably receive thereon a sealing cap that is illustrated at 29 in FIGURE 1. The tube 24 is also provided with an annular flange 30 which is spaced from the rim bead 28 and is adapted to engage the top side 16 of container 10 so as to be heat sealed thereto. The joint between flange 30 and tube 24 is enlarged at 31 for strength.

The tube 24 is provided with a first aperture means composed of a plurality of upper apertures 32 that are spaced from but relatively closely adjacent to the rim means 28. The apertures 32 may be rectangular and elongated as shown in FIGURE 2, or may be circular as shown at 32' in FIGURE 3, or may be of any other shape. One important feature is that the uppermost edges of apertures 32, that are spaced closest to the rim bead 28 are located adjacent to the plane of the flange 30 so that when flange 30 is connected to top 16, then apertures 32 are located so as to effect complete drainage from the container 10 when the container is in an inverted position. The tube 24 is also provided with second aperture means composed of a plurality of lower apertures 34 that are spaced from but adjacent to the lower end of tube 24.

The lower end of tube 24 engages the bottom 17 of the container 10, thereby serving to space apart portions of the container and to partially rigidify the container defining means. Preferably, the lower end of tube 24 abuts the bottom 17 of the container. Alternatively, the lower end of tube 24 may be heat sealed to bottom 17 and this may be accomplished by providing a peripheral flange at the lower end of tube 24 which engages bottom wall 17 for heat sealing thereto. The tube 24 is of a plastic material of the same nature or compatible with the plastic of container 10 so that proper heat sealing may be effected.

As seen in FIGURE 2, the bottom 17 may be formed, or provided, with a recessed portion 17a which is offset from the center of the container oppositely to the offset of aperture 22, and which is of sufficient diameter and depth to receive therein the portion of tube 24 that extends above top 16 and having a cap 29 thereon. This arrangement then permits of stacking of a plurality of containers 10, one on top of another.

It will be seen that the use of the tube 24 provides a relatively rigid columnar construction that is more rigid than the container 10 and the upper end of which readily adapts itself for use with an automatic capping machine so that caps 29 may be automatically applied to the rim bead 28. The container 10 with tube 24 therein may also be used with automatic filling machines wherein a filling tube is inserted into tube 24 for filling the container with milk, or the like. During filling, the liquid enters through lower apertures 34, the upper apertures 32 serving to vent the container. Since the lower apertures 34 are quickly immersed by the liquid being introduced into the container, the construction provides a bottom filling aspect which avoids undesirable foaming.

In using the container 10, the cap 29, which may be of the snap-on type as illustrated in FIGURE 3, is removed and the upper apertures 32 then serve as flow passageways through which the liquid may be dispensed from the spout, or upper end, of tube 24. If the container 10 is used in an automatically dispensing operation, such as when the container is inverted, then the upper apertures 32 serve as liquid drain apertures while the lower apertures 34 serve as vent means to introduce air to the interior of the container. The rim bead 28 is appropriately shaped to provide attachment means adaptable to receive a valving attachment thereon for use in a dispensing machine as disclosed in my co-pending application, Serial No. 60,150, filed October 3, 1960.

While the tube 24 is shown for use in combination with a shape-sustaining container 10 which is of relatively thin gauge plastic, it will also be appreciated that the fill tube 24 may also be used in a combination with containers whose walls are not shape-sustaining.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of ther United States is:

1. A cappable container comprising, in combination: an elongated relatively rigid filler tube of plastic material having radially enlarged rim means defined thereon at one end of the tube to provide an annular shoulder for releasably receiving thereover a snap-on type cap, said rim means adapted to have a snap-on type closure cap automatically applied thereon by a capping machine, first aperture means in the wall of said tube spaced from but relatviely closely adjacent to said rim means, second aperture means in the wall of said tube spaced from but adjacent to the other end of said tube, container defining means enclosing the greater portion of said tube that is located between said rim means and said other end of the tube, said tube also providing an annular attachment flange located axially of said tube between said rim means and the edge of said first aperture means closest to said rim means, said container being sealed to said annular attachment flange and the other end of said tube engaging said container defining means.

2. A cappable container comprising, in combination: an elongated relatively rigid filler tube of plastic material having radially enlarged rim means defined thereon at one end of the tube to provide an annular shoulder for releasably receiving thereover a snap-on type cap, said rim means adapted to have a snap-on type closure cap automatically applied thereon by a capping machine, first aperture means in the wall of said tube spaced from but relatively closely adjacent to said rim means, second aperture means in the wall of said tube spaced from but adjacent to the other end of said tube, container defining means of relatively thin gauge plastic enclosing the greater portion of said tube that is located between said rim means and said other end of the tube, said tube also providing an annular attachment flange located axially of said tube between said rim means and the edge of said first aperture means closest to said rim means, said container being sealed to said annular attachment flange, the other end of said tube engaging said container defining means, and said tube being more rigid than said container defining means.

3. A cappable container comprising, in combination: an elongated relatively rigid filler tube of plastic material having radially enlarged rim means defined thereon at one end of the tube to provide an annular shoulder for releasably receiving thereover a snap-on type cap, said rim means adapted to have a snap-on type closure cap automatically applied thereon by a capping machine, first aperture means in the wall of said tube spaced from but relatively closely adjacent to said rim means, second aperture means in the wall of said tube spaced from but adjacent to the other end of said tube, container defining means enclosing the greater portion of said tube that is located between said rim means and said other end of the tube, said container being sealed to said tube axially of said tube between said rim means and the edge of said first aperture means closest to said rim means, the other end of said tube engaging said container defining means, said container defining means being of a relatively thin gauge plastic material that is less rigid than said tube, and said tube serving to space apart portions of said container defining means and to partially rigidify said container defining means.

References Cited in the file of this patent

UNITED STATES PATENTS 1,155,070    Kessler _____ Sept. 28, 1915

FOREIGN PATENTS 559,556    Germany _____ Sept. 22, 1952